Oct. 6, 1959 P. H. WEISS 2,907,816

SUBSCRIPTION TELEVISION SYSTEM

Filed Feb. 21, 1958 5 Sheets-Sheet 1

PHIL H. WEISS
INVENTOR.

BY Lyon & Lyon

ATTORNEYS

PHIL H. WEISS
INVENTOR.

BY Lyon & Lyon
ATTORNEYS

Oct. 6, 1959 P. H. WEISS 2,907,816

SUBSCRIPTION TELEVISION SYSTEM

Filed Feb. 21, 1958 5 Sheets-Sheet 3

PHIL H. WEISS
INVENTOR.

BY Lyon & Lyon

ATTORNEYS

PHIL H. WEISS
INVENTOR.

BY Lyon & Lyon
ATTORNEYS

PHIL H. WEISS
INVENTOR.

BY Lyon & Lyon
ATTORNEYS

United States Patent Office 2,907,816

Patented Oct. 6, 1959

2,907,816

SUBSCRIPTION TELEVISION SYSTEM

Phil H. Weiss, Panorama City, Calif., assignor, by mesne assignments, to Paramount Pictures Corporation, New York, N.Y., a corporation of New York Application February 21, 1958, Serial No. 716,660

18 Claims. (Cl. 178—5.1)

This invention relates to subscription television systems and, more particularly, to improvements therein.

In devising arrangements for subscription television, consideration must be given to the fact that not everyone who owns a television set will become a subscriber. Therefore, in order to insure that a subscription television program is intelligibly presented to the subscribers to the system, and not to the general public, considerable efforts will have been expended toward transmitting subscription television programs in a form to be unintelligible to all receivers except for those which have attachments enabling the receivers to intelligibly present the signals received. The problem of rendering the program unintelligible at the transmitter and intelligible again at the receiver is not an unusually difficult one. It must be appreciated that the attachment required at a receiver must be made as inexpensive as possible, since it is contemplated that a large number of subscribers will be obtained, and, unless the receiver attachment is minimal in cost, the financial aspects of the situation will keep the system small. In view of all the operations which a subscription television receiver attachment must carry out, this poses a difficult problem.

One other aspect of the investigations conducted heretofore has shown that the amount of security obtainable for a system was in direct relationship to the cost of the receiver attachment. In other words, the more encoding applied to a program at the transmitter, the more costly the decoding attachment required at the receiver. As the coding arrangement at a transmitter was simplified, the cost of the attachment at the receiver was decreased, but a point is reached at which such coding can be readily broken, and thus is substantially useless.

An object of the present invention is the provision of a novel subscription television arrangement.

Another object of the present invention is the provision for rendering a subscription television transmission secure against nonsubscribers while maintaining the required attachment at a subscriber receiver inexpensive.

Still another object of the present invention is the provision of a novel arrangement for rendering a subscription television transmission secure.

These and other objects of the invention are achieved in a preferred embodiment subscription television system wherein, at the transmitter, the horizontal synchronizing pulse and horizontal blanking pulse are reduced or replaced by a grey level pulse. A suitable signal for reconstituting horizontal sync, such as a sine wave signal is generated from the horizontal blanking pulse having the same frequency and phase. The composite video signal including the grey-level pulse is modulated on a radio-frequency carrier and is then transmitted over one channel and the horizontal synchronizing sine wave may be transmitted over another channel. At a subscriber receiver, an attachment is provided which has means, energized when the subscriber wishes to purchase a program, which uses the sine wave signal for reconstructing a horizontal synchronizing pulse. This is inserted in the composite video signal having the grey-level pulse, at the proper time. The composite signal thereafter is applied to the antenna terminals of the television receiver. The receiver thereafter shows a picture which is completely acceptable, in accordance with present-day standards. Without the attachment, or when a program is not purchased, an unintelligible picture is presented.

In order to further maintain security of the system, the audio signals which usually accompany the program video signals are transmitted on the same channel as the sine wave signal. On the channel which transmits the composite video with grey-level signals replacing synchronizing signals, there are transmitted audio signals representative of a barker. These barker audio signals extol the virtues of the program and also indicate the times it will be presented, as well as the cost. At a receiver, whether subscriber or nonsubscriber, the barker signals are reproduced by the audio system of the television receiver. The subscriber receiver, in addition, has a switch, which, when a program is purchased, is automatically operated to connect the audio system of the receiver directly to an input from the receiver attachment for directly receiving the program audio signals.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a block diagram of the additional structure required to modify a television transmitter in accordance with this invention;

Figure 2*a* is a wave shape diagram showing the normal composite video signal;

Figure 2*b* is a wave shape diagram showing a composite video signal modified in accordance with this invention;

Figure 2*c* is a wave shape diagram showing a composite videa signal reconstituted at a receiver in accordance with this invention;

Figure 1:
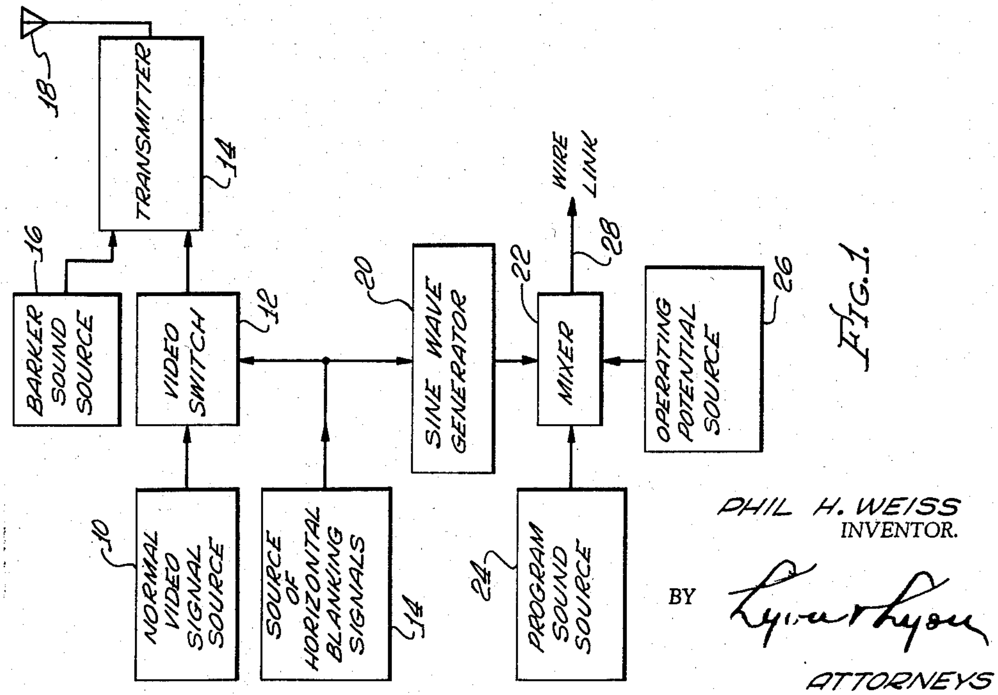

Figure 1 is a block diagram of a suitable structure at a transmitter to modify it for use in a subscription television system in accordance with this invention. Signals from a source of normal video signals 10 are applied for a video coding switch 12. Signals from a source of horizontal blanking signals 14 actuates the video coding switch 12 so that the output thereof will comprise the composite video signals with a grey-level pulse in place of the usual horizontal blanking and synchronizing signals. By a grey-level pulse is meant a pulse having an amplitude between the black level and the white level of the video signal. The output of the video coding switch 12 is applied to a transmitter 14. The transmitter also has applied thereto audio signals from a barker sound source 16. The barker sound source provides signals which inform the listener as to the virtues of the program to be transmitted, as well as its cost, the times that it will be reproduced, etc. The transmitter 14 modulates the modified composite video signals and the barker sound signals on the carriers in accordance with the well-known method for presently transmitting a composite video signal and accompanying program sound signal. These are then radiated from an antenna 18.

The output of the source of horizontal blanking signals 14 is also applied to a sine wave generator 20. The sine wave generator 20 generates a 15.75 kilocycle sine wave, whose frequency and phase are determined by the horizontal blanking signals. The sine wave signal is generated for the purpose of reconstituting the horizontal sync signals at a receiver. Actually, other wave shapes having the same phase and frequency as the sine wave may be employed in its place for this purpose, as those skilled in the art will readily recognize. Therefore, it is not intended that this invention be limited by the description herein of a sine wave for reconstituting purposes. However, as a practical proposition, a sine wave is most easily generated, uses the least bandwidth, and may be readily and easily transmitted by air or wire. Therefore, it is preferred. These sine wave signals are applied to a mixer 22, to which is also applied signals from the program sound source 24 and direct current from an operating potential source 26. The output of the mixer, which is a combination of the three signals, is applied to a wire link 28, which is connected to an attachment at each one of the subscriber television receivers. Since the frequency of the signals being carried by the wire link is in the audio frequency range, an ordinary, inexpensive, twisted pair of wires may be used. Thus, for the purpose of installing a subscription television system in large population centers, there is no need to run extensive coaxial cable between the transmitter and the subscriber receiver, as has been proposed heretofore. A cheap and inexpensive twisted pair of wires is used instead to carry one portion of the subscription television signals, the other portion of which is transmitted by air. A wire link, for all intents and purposes, already exists between a television transmitter and a great number of subscriber receivers in the form of either telephone lines or power lines.

Figures 2A, 2B, 2C:
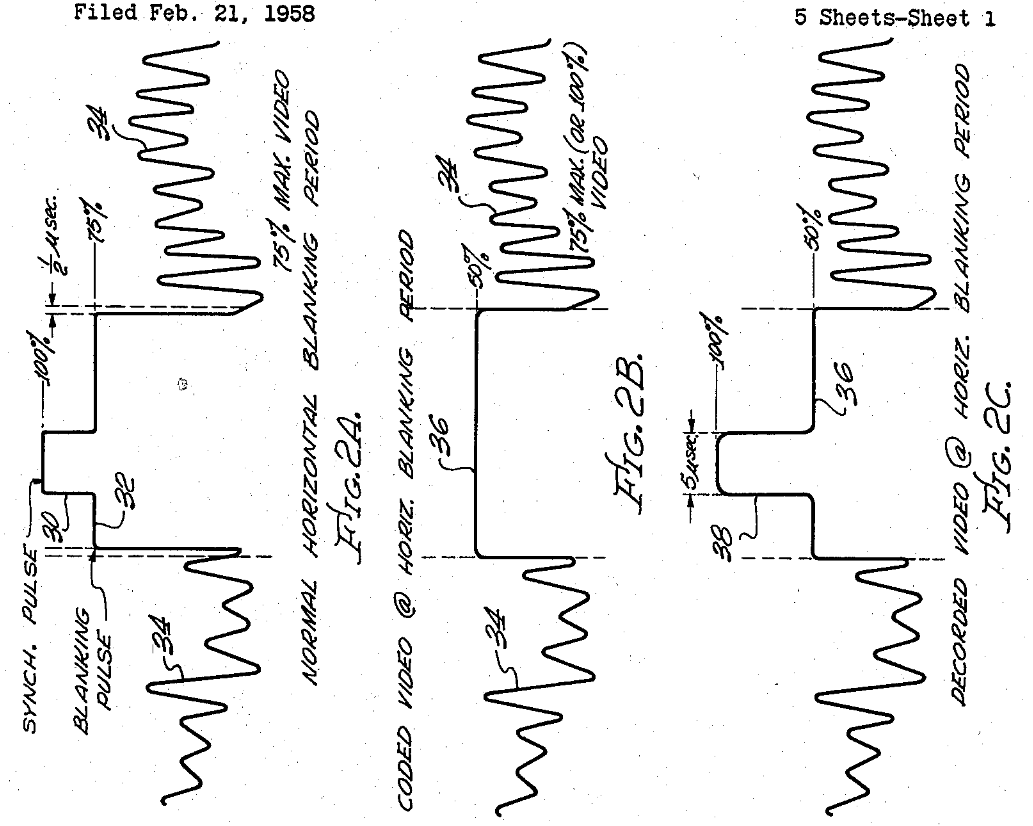

Figure 2A shows a wave shape diagram of the composite video signal, and, more specifically, that portion in the region of a horizontal blanking pulse 32 and a superimposed horizontal sync pulse 30. The level of the horizontal blanking pulse 32 is 75 percent of the maximum signal level, which is the level attained by the horizontal sync pulse 30, considered as 100 percent. The 75 percent level of the blanking pulse is the black signal, and the video signal 34 may go as high as the black level.

Figure 2B shows a wave shape illustrating the composite video in the region of the horizontal blank pulse as it appears after modification, in accordance with this invention. This wave shape is not shown modulated on the radio-frequency carrier for the purpose of maintaining clarity in the drawings. The video signal portions remain unaffected, but the blanking pulse and sync pulse portions are replaced by a pulse whose level is in the grey region of the video signal, or 50 percent of the maximum signal level attained and whose width overlaps the blanking pulse width by a half microsecond on either side. This pulse is designated as the grey-level pulse 36.

Figure 2C is a wave shape of the composite video signal in the region of the horizontal blanking period, as it appears after reinsertion of the synchronizing pulse 38 by the receiver attachment. This wave shape is not shown modulated on the radio-frequency carrier, but as it appears after demodulation, to maintain clarity in the drawings and explanation. This synchronizing pulse 38 is a five microsecond wide pulse which is superimposed on the grey-level pulse 36 at the same location as was occupied by the synchronizing pulse 30 relative to the blanking pulse 32. As will be shown later, the grey-level pulse is used in the restoration of the horizontal synchronizing pulse. This is done by increasing each grey-level pulse energy content, or raising its level during the proper interval to that required for horizontal synchronization responsive to the reconstituting signal. Effectively, the ratio of reduction at the transmitter is effectively restored at the receiver. The inserted horizontal synchronizing pulse 38 serves the identical function as the synchronizing pulse 30, as far as the receiver is concerned. The picture presented at the reproducing cathode-ray tube will be the identical type presented on the usual commercial television broadcast, with the exception that the edge portions of the picture which are normally black will be grey. However, since the picture is widened, so that only the picture portion is displayed and the black borders are covered by a mask, no deleterious effects are created by the present invention.

Figure 3:
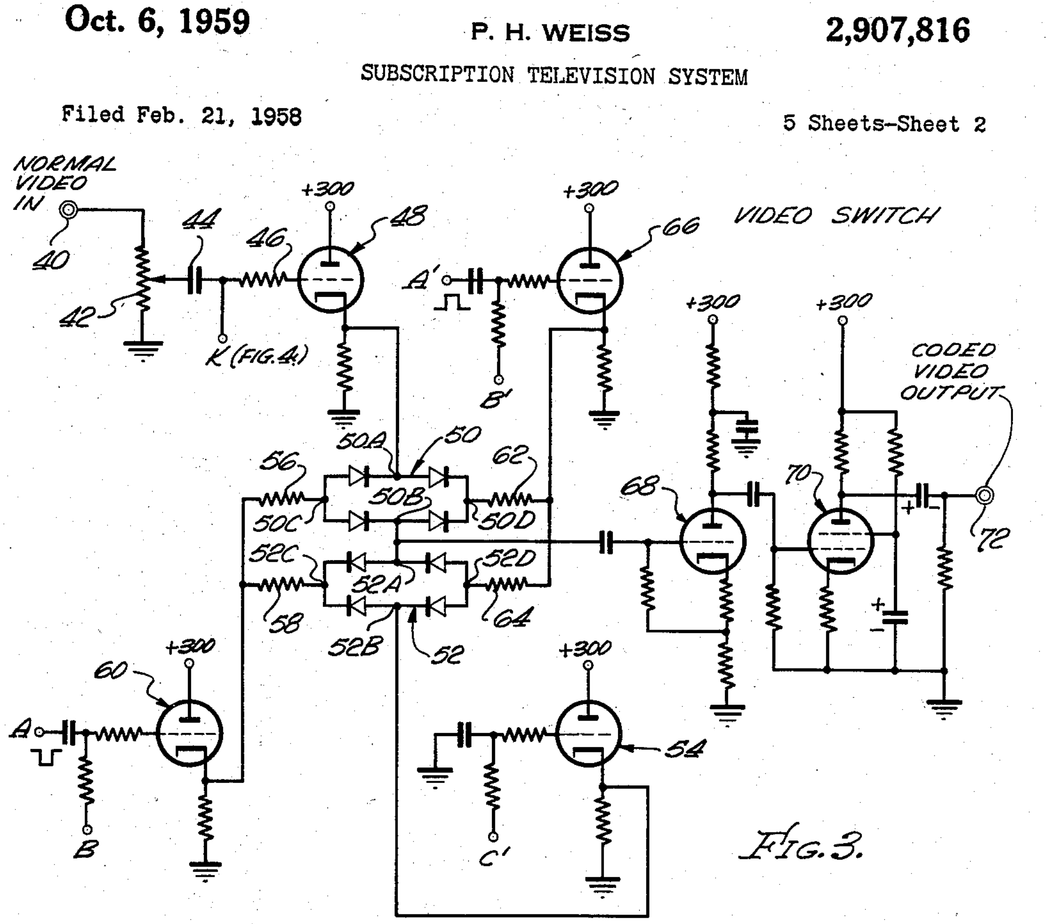
Figure 3 is a circuit diagram of the video coding switch arrangement shown in Figure 1.
Figure 4:
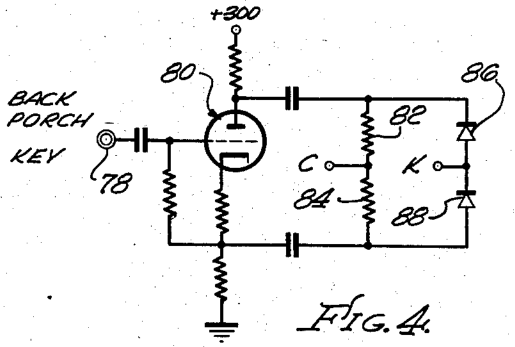
Figure 4 shows a circuit for providing for the circuit shown in Figure 3 the line-to-line direct-current level using the backporch key signal.
Figure 5:
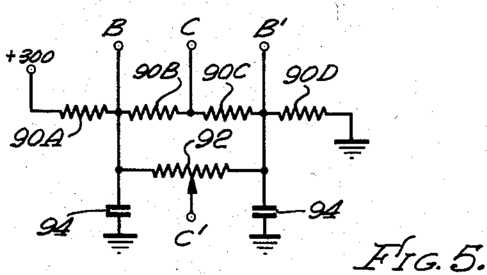
Figure 5 shows a circuit for setting the required bias levels in the circuit shown in Figure 3.

Figure 3 is a circuit diagram of the video coding switch 12, shown in Figure 1, illustrating how a grey-level pulse signal is inserted into the composite video signal in place of the horizontal blanking pulse and horizontal synchronizing pulse. Normal video is applied to an input terminal 40, and the level of the signal established is set by the potentiometer 42. The potentiometer output is coupled through a condenser 44 and resistor 46 to the grid of a tube 48. Line-to-line level setting is obtained from a circuit using backporch key signals. This circuit is shown in Figure 4 and connection is made thereto through the lead designated as K. Tube 48 is connected as a cathode follower to one terminal 50A of a bridge network 50, which is composed of four rectifiers. The opposite terminal 50B of the rectifier bridge 50 is connected to a terminal 52A of a second rectifier bridge 52, also composed of four rectifiers which are poled oppositely to the rectifiers comprising bridge 50. Output from the two rectifier bridges is taken from terminals 50B, 52A. Another terminal 52B of the rectifier bridge 52 is connected to a cathode-follower tube 54. The grid of the cathode-follower tube 54 is biased by a potential source over a lead, designated as C'. A suitable potential source is shown in Figure 5 of the drawings.

A connection is made from one of the two remaining terminals 50C, 52C of bridges 50, 52 through two resistors 56, 58 to the cathode of a tube 60. This tube has its quiescent conduction current established by potential received from the bias source shown in Figure 5 over a lead designated by the letter B. This tube may be cut off by the negative signals applied to its grid over a lead designated by the letter A, which is connected to a blanking signal source shown in Figure 6 herein. The remaining terminals 50D, 52D of the bridges 50, 52 are connected through resistors 62, 64 to the cathode of a tube 66. This tube also has its quiescent condition established by the bias applied to its grid from the potential source in Figure 5 over the lead designated by the letter B. Switching signals are applied to this tube 66 over a lead designated as A, which is connected to the blanking pulse signal source shown in Figure 6.

Figure 6:
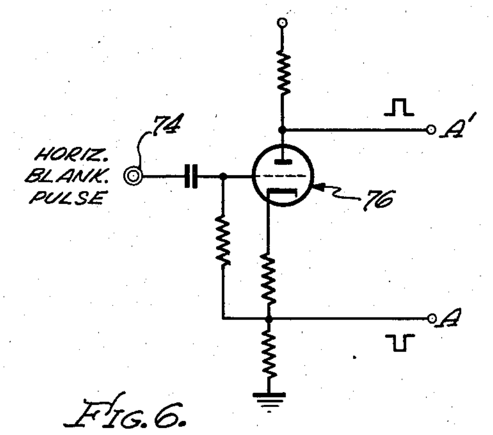
Figure 6 shows a circuit for generating the switching pulse employed in Figure 3.

The operation of the switching circuit shown is as follows. During the actual occurrence of the video signals, the conduction levels of the tubes 60 and 66 are such that the lower rectifier bridge 52 is cut off and the upper rectifier bridge 50 permits the video signals received from tube 48 to be passed through to a first amplifier 68. The output of amplifier 68 is applied to the second amplifier 70, the output of which is applied to the coded video output terminal 72. For purposes of use with the camera signal, there is usually generated a horizontal blanking pulse at the transmitter, known as the wide blanking pulse. This wide blanking pulse has one microsecond duration in excess of that of the horizontal blanking pulse actually transmitted in the composite video signal. As shown in Figure 6, the wide horizontal blanking pulse is applied to input terminal 74 of a phase-inverter tube 76. The output which is applied along the lead designated by the letter A to the grid of tube 60 is obtained from the cathode of the phase-inverter tube 76. The output applied along the lead A to the grid of tube 66 in Figure 3 is obtained from the plate of tube 76. As is well known, the pulses applied over leads A and A′ will have the opposite polarity and will exist simultaneously. The wide horizontal blanking pulse which is applied to the input terminal 74 is a negative pulse, in response to which the pulse over the line A′ will be positive and that over line A will be negative going.

The level-setting circuit for the video signal is derived from the backporch key signal generated at the transmitter. As shown in Figure 4, the backporch key signal is applied to an input terminal 78, which is connected to the grid of the phase-inverter tube 80. In response to the backporch signal, two opposite polarity pulses are applied through two coupling condensers to a bridge network, consisting of two resistors 82, 84, connected in series, and in parallel therewith, two series-connected rectifiers 86, 88. To the junction of the two resistors, there is applied a direct-current bias over a lead designated as C from Figure 5. This sets a D.C. level at the junction of the two rectifiers 86, 88. This junction is connected over a lead designated by the letter K to the corresponding K lead in Figure 3 at the input to the tube 48. The occurrence of the backporch key signal pulses adjusts this level to whatever is the proper level for a particular line by enabling the rectifiers 86, 88 to conduct, in accordance with the D.C. level of the video signal.

As shown in Figure 5, the bias-providing circuit for the switch arrangement shown in Figure 3 includes a plurality of resistors 90A, 90B, 90C, and 90D, which are connected in series across the source of operating potential. The lead lines designated by the letters B, C, and B′ are connected to the junction of these resistors. A potentiometer 92 is connected across resistors 90B and 90C. The movable arm of potentiometer 92 is connected to the lead line designated as C′. Condensers 94, 96 bypass to ground any pulse frequency, which may penetrate into this bias source. The setting of the potentiometer 92 establishes the bias level of the voltage applied over lead C′ to the grid of tube 54. This establishes the conduction of that tube, and also the potential which is applied to the rectifier bridge 52 in Figure 3. This potential is established so that when the rectifier bridge 50 is cut off and the rectifier bridge 52 is rendered conducting, the output of the bridge 52, which is applied to tube 68, will have the amplitude desired for a grey-level pulse. In other words, the value of the potential which is applied across bridge 52 from the cathode of tube 54 is that required to provide a grey-level potential at the output of the bridge.

From what has been described, the operation of the arrangement shown in Figure 3 should become apparent. The values of the potentials applied over lead lines B and B′ are such as to maintain the rectifier bridges 50 and 52 respectively conducting and nonconducting in the absence of any input over lead lines A and A′. When such input occurs, then the rectifier bridges 50 and 52 are made to respectively switch conditions of conduction, whereby the potential set by the tube 54 is the output obtained from the two bridges and the signal obtained from the tube 48 is blocked.

Figure 7:
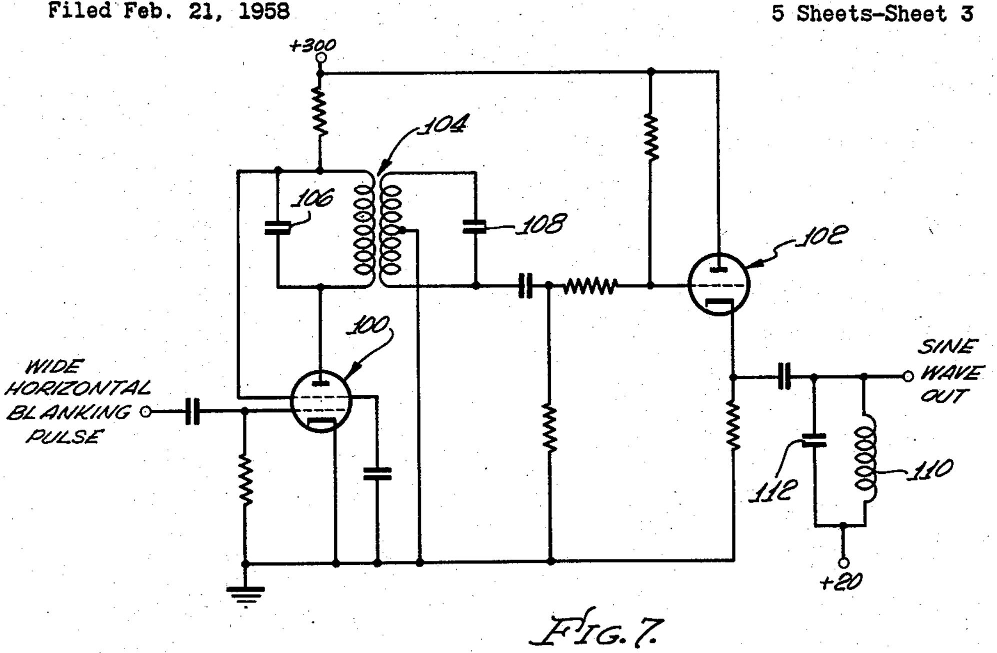
Figure 7 is a circuit diagram of a sine wave generator which may be employed at the transmitter.

Reference is now made to Figure 7, which shows a circuit diagram of a suitable sine wave generator which may be employed at the transmitter. The horizontal blanking signals are applied to the grid of a tube 100. There is a first tuned circuit in the plate of the tube 100 which is connected to a second tuned circuit in the grid of a following tube 102. These tuned circuits include the primary and secondary of a transformer 104, which are respectively tuned by the condensers 106 and 108. Since the input to the tube 100 is a pulse, the flywheel is employed to provide as an input to the grid of tube 102 a sine wave having the frequency of the horizontal blanking pulses and synchronized to be in phase therewith. The output of tube 102 is derived from its cathode to which another tuned circuit, consisting of an inductance 110 in parallel with a condenser 112, is connected for the purpose of further assuring that a pure sine wave output is derived therefrom.

Figure 8:
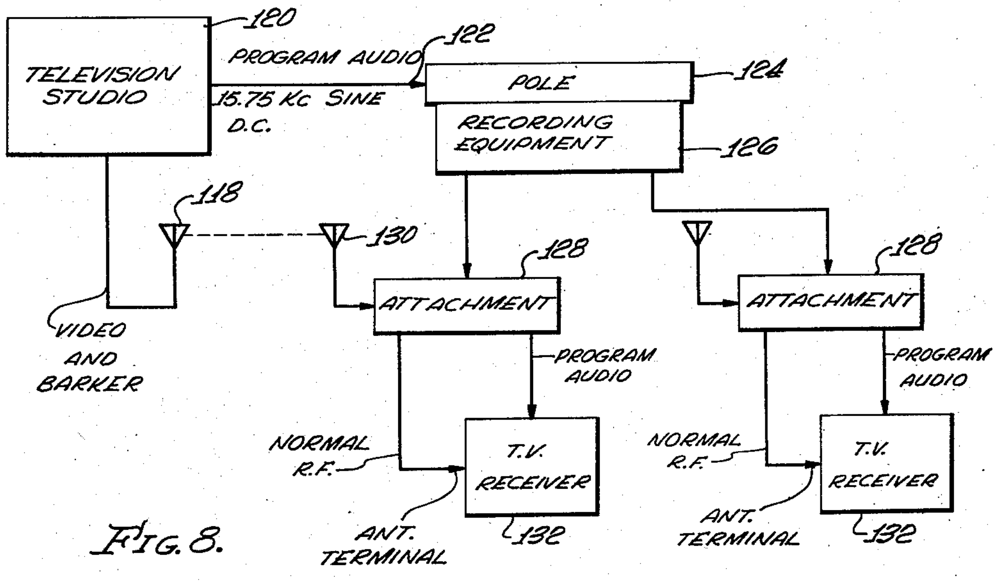
Figure 8 is a block diagram showing how a subscriber television program may be distributed to subscriber receivers.

Figure 8 is a block diagram showing how subscriber television programs in accordance with this invention may be distributed to subscriber receivers. At the television studio 120, there are generated the coded video program and the barker, and these are transmitted over the antenna 18. The program audio, 15.75 kilocycle sine wave, and direct current are transmitted over a second channel, consisting of the wire 122, which connects to the attachments for the subscriber receivers. This wire may be supported, for example, by a pole 124. From each one of the poles 124, the wire is connected through recording equipment 126 to the attachments 128 for each one of the subscriber receivers. The antennas 130 for each one of the subscriber receivers are also connected to the attachments 128, instead of directly to the television receivers 132, as is customary. Also connected from each attachment to the receivers 132 is a line which supplies the program audio when a subscriber has purchased the program being transmitted. As will be shown subsequently, the recording equipment 126 can make a recording indicative of the fact of such purchase for each subscriber.

Figures 9, 10:
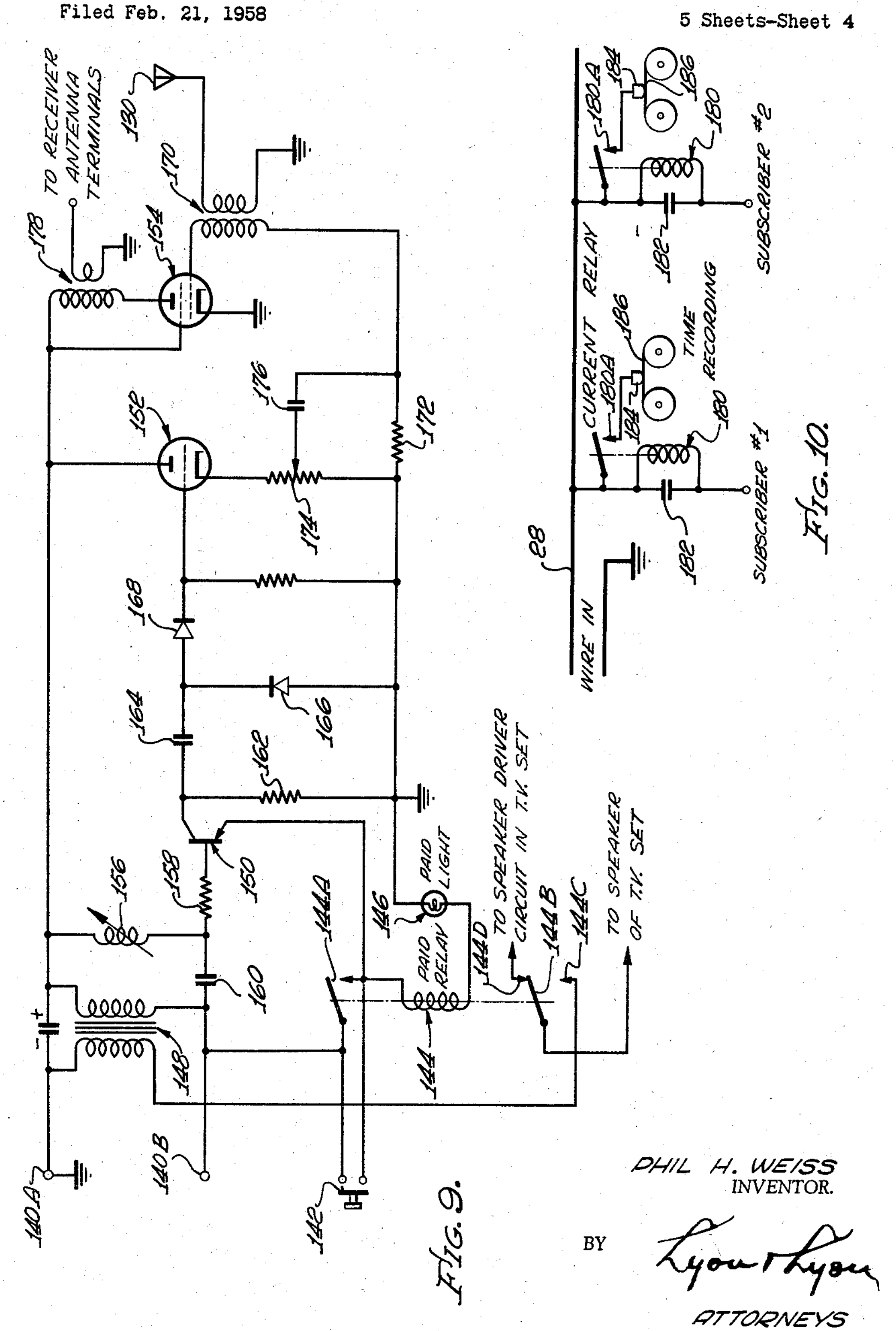
Figure 9 is a circuit diagram of the attachment provided for each subscriber receiver.
Figure 10 is one recording arrangement of the purchase of a program which may be employed.

Figure 9 is a circuit diagram of an attachment which is provided for modifying a television receiver so that it may be employed in a subscription television system in accordance with this invention. From each pole there are connected the two wires carrying the program audio 15.75 kilocycle sine wave signals and the direct-current operation potential to two terminals 140A, 140B. One of the terminals 140A is connected to ground. The other terminal 140B is connected to one contact of a push-button switch 142 and also to the normally open contact 144A of a paid relay 144. The other side of the push-button switch 142 is connected directly to the coil of the relay 144. The coil of the relay 144 is connected through a paid light 146 to ground. Accordingly, when the push-button 142 is manually depressed, indicative of the desire to buy a program, the operating potential existing over the wire link energizes relay 144, lights the light 146, and contact 144A, which is now closed, shunts the push-button switch 142 and latches the paid relay 144.

The primary of an audio transformer 148 is connected across the wire link. Program audio signals received over the wire link are applied to the primary winding of the audio transformer 148. The secondary of the audio transformer 148 is connected to one contact 144B of a pair of single-pole, double-throw contacts of the relay 144. The common movable contacts 144C of the single-pole, double-throw contacts is connected directly to the speaker of the television set. The remaining contact 144D is connected to the driver circuit for the speaker in the audio circuit of the subscriber receiver. When the paid-up relay 144 is not operated, then the audio amplifier in the receiver is connected to the loudspeaker over contacts 144C and 144D and supplies audio signals directly to the loudspeaker of the television set. When the relay 144 is operated, then contact 144C moves from contact 144D to 144B, thereby connecting the speaker of the subscriber receiver to the audio transformer 148, and program audio can then be heard.

When the relay 144 is closed, its contacts 144A also enable operating potential to be applied to the emitter of a transistor 150. The transistor base receives direct current through the primary of transformer 148 and through a variable audio choke 156 and a resistor 158. Direct-current potential is also applied continuously through the transformer primary to the plates of tubes 152 and 154. Condenser 160 and variable choke 156 are used to compensate for any phase shift occurring in the course of transmission of the sine wave signals. These sine wave signals are applied to the base of the transistor 150. The choke 156 blocks or prevents these sine wave signals from being shorted to ground.

The transistor output, consisting of amplified sine wave signals, is derived from its collector. The collector is connected to a pulse-shaping network including a resistor 162 in shunt and a condenser 164 in series with the collector transistor 150. These, effectively, differentiate the output of the transistor. Polarity of the signal being derived from the sine wave is established by means of the diodes 166, which connects condenser 164 to ground for negative wave shapes, and diode 168, which permits positive-going wave shapes to be applied to the grid of a tube 152. Accordingly, whenever the sine wave received from the transmitter has a positive-going phase, the tube 152 is enabled to conduct for a time determined by the values of the network coupling the collector of the transistor 150 to the grid of that tube. Tube 15 operates as a limiter whereby the amplitude of its output remains substantially constant.

The antenna 130 of the subscriber receiver is coupled by means of a radio-frequency transformer 170 to the grid of a tube 154. It will be noted that the secondary of the coupling transformer is in series with a resistor 172. This resistor enables the insertion or addition of a signal derived from the cathode of the tube 152 to that existing across the secondary of transformer 170. The cathode of tube 152 has a potentiometer 174 in series therewith, which is coupled through a condenser 176 to the junction between the resistor 172 and the secondary of the RF transformer 170.

Referring back to Figure 2C of the drawings, it should be appreciated that the pulse derived from the sine wave obtained over the wire link is adjusted by coil 156 to occur at a time when the grey-level pulse, modulated on an RF carrier, is being received from the antenna. Thus, the pulse and radio-frequency signals are applied to the grid circuit of tube 154 as a result of which the tube is permitted to amplify the radio-frequency signals during the occurrence of the pulse. This has the effect of increasing to a predetermined value the ratio of the radio frequency during the horizontal synchronization interval to the radio frequency during the video interval. Upon subsequent demodulation, the signal appears as shown in Figure 2C. It is seen that the result of the multiplication operation by tube 154 has been to increase the grey-level pulse energy content, or to raise its level during the proper interval to that required for horizontal synchronization, responsive to the reconstituting signal. Coupling between the output of tube 154 and the antenna terminals of the television receiver is made through a second RF transformer 178, the primary of which is in series with the plate circuit of tube 154 and the secondary of which is coupled to the antenna terminals of the receiver. It should be noted that the reinsertion of the synchronizing signals occurs while the video signals are still modulated on the carrier signal and outside of the television receiver. After such reinsertion, the composite video modulated on a carrier is applied to the receiver antenna terminals for demodulation and other processing as is done to the normally transmitted composite video signals.

Before switch 142 is operated, the transistor 150 does not receive operating potential, and thus no horizontal synchronizing pulses are present in the video received. However, the paid-up relay 144 is inoperative, whereby barker signals, which are received by the antenna 132, may be applied to the receiver through the tube 154. After push-button switch 142 is operated, transistor 150 is enabled to amplify the sine wave signal so that horizontal synchronizing signals may be derived therefrom. The paid-up relay 144 switches the loudspeaker in the receiver from the audio amplifier within the receiver to the output of transformer 148. The system may be operated without this added secrecy feature, namely, furnishing program sound over the wire link and barker over the air, since there is sufficient security in the video signals being received to prevent unauthorized persons from deriving horizontal synchronizing signals from the signal receiver over the air.

Thus, only the video coding may be employed and any necessity for making any audio reconnections inside the receiver are eliminated. Another arrangement for omitting any wiring connections in the receiver is to provide the attachment with an audio amplifier and speaker whereby it may reproduce the program sound. No switching is required. When the program sound is heard, the audio gain control on the receiver is turned down and the program-sound level is controlled by a gain control supplied at the attachment.

When a program has terminated, by interrupting the direct current being sent over the wire link long enough to enable relay 144 to become inoperative all subscriber receivers are reset and thereafter another subscription television program, for which a new charge may be made, can be transmitted.

Figure 10 is a circuit diagram of an arrangement for recording the purchase of a program by means of the recording equipment 126 on the pole 124, shown in Figure 8. At each pole which distributes wire links to a plurality of subscription television system customers, there are provided a plurality of current relays 180. Each current relay is in series with one of the wires of the wire link connected to the receiver attachment for the subscriber. Thus, whenever a subscriber actuates a push-button 142, current will flow and the current relay 180 will be actuated. Across each current relay coil a condenser 182 is provided in order to bypass the sine wave and audio signals around the current relay coil.

Each current relay has a pair of contacts 180A, which when closed provide current to make a recording. This can either be a magnetic recording or a writing stylus 184, which causes a chemical reaction by the application of potential to recording paper 186, which paper is gradually moved by suitable clockwork mechanism, so that the time of the purchase may be readily detected from the location of the mark. A single roll of paper having a plurality of tracks on paper may be employed at a pole, with each track being assigned to a different subscriber, so that the fact of a purchase can be readily identified. Periodic removal of the paper is made for accounting purposes. Alternative arrangements may be to employ magnetic tape or other media which may record the fact of a purchase by the effects of the operating potential being applied thereto and which may be read back periodically for billing purposes.

Figure 11:
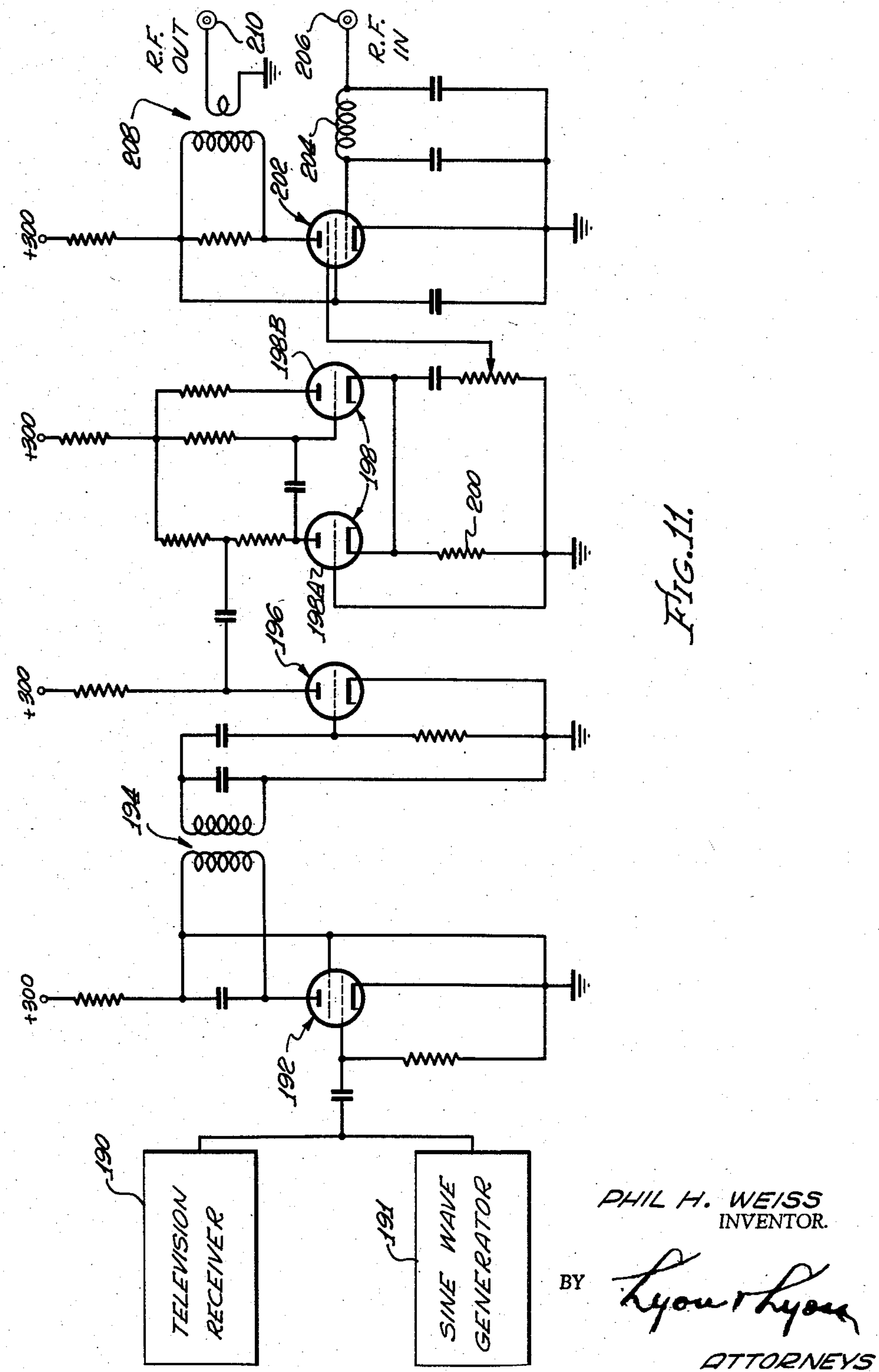
Figure 11 is a circuit diagram for converting a standard received composite video signal into one having grey-level sync pulses.

In those locations wherein service to a community is by means of retransmitting signals received from a remote television station, either by means of coaxial cable or an antenna advantageously mounted for receiving and rebroadcasting signals, Figure 11 shows an arrangement suitable for converting the received signals in accordance with this invention. Expressed alternatively, Figure 11 is a circuit diagram of an arrangement for converting the received standard television composite video signal into a video signal having grey-level sync pulses. It is necessary to derive horizontal blanking signals from the received standard composite video signals. These may be easily derived from a television receiver 190, located at the position of the retransmitter and receiving the broadcast to be retransmitted.

The horizontal blanking pulses derived from the receiver 190 are applied to a sine wave generator 191 and to the control grid of a pulse-amplifier tube 192. The output of this tube is coupled by means of a pulse transformer 194 to a second pulse-amplifier tube 196. The output of this tube drives a one-shot multivibrator 198. As is well known, the one-shot multivibrator consists of two tubes 198A, 198B, which have their cathodes connected to a common-cathode load 200 and the control grid of tube 198B coupled to the anode of tube 198A in a manner whereby, in the absence of an input pulse, tube 198B is conducting and tube 198A is nonconducting. When an input pulse is received from tube 196, tube 198B is rendered nonconducting and tube 198A is rendered conducting. This state of instability lasts for a time determined by the circuit components of the one-shot multivibrator. The time chosen for the purposes of this invention comprises the width of the desired grey-level pulse, or 11 microseconds.

Output from the one-shot multivibrator during the 11 microsecond interval of instability is applied from the common-cathode coupling resistor 200 to the suppressor grid of a tube 202, whereby the maximum output obtainable from this tube in response to the input during this interval will be a signal having the level of a grey-level signal. The control grid of the tube 202 is connected through a delay line 204 to a radio-frequency input terminal 206. This terminal receives the same signals as are applied to the television receiver 190. The purpose of the delay line 204 is to establish the overlap of the horizontal blanking pulse by the signal received from the one-shot multivibrator. As a result, the output of the tube 202 during the horizontal blanking pulse interval will be a grey-level signal pulse. By means of an RF transformer 208 in the plate circuit of tube 202, the modified composite video signal in accordance with this invention is coupled to an RF output terminal 210 for subsequent retransmission in the manner previously described.

Accordingly, there has been shown and described herein a novel, useful, and unique arrangement for coding or rendering a television transmission usable in a subscription television system. The transmitter modifies the television program signals so that a nonsubscriber or a subscriber who has not yet purchased the program will not be able to see an intelligible program, nor will he be able to receive the audio signals accompanying said program. The attachment at the receiver required to convert signals into a form suitable for an intelligible display at a receiver is inexpensive. It is worth reiterating that one of the unique features of this invention is that the reconstitution of the coded video signals is performed at radio frequency and while modulated on the carrier. Thereby, any subscriber receiver can be brought into the subscription television system by merely connecting an attachment between the receiver antenna terminals and the antenna. The most difficult and troublesome portions of any receiver, namely, the RF, IF, and synchronizing sections, need not be tampered with. It is also within the scope of this invention, if desired, to provide a coinbox at each receiver of the type described and shown in an application for Coinbox for Subscription Television, by John C. Nyberg, Serial No. 706,119, filed December 30, 1957, and assigned to a common assignee. This coinbox may be provided with tone signals to enable it to operate and show a price which must be paid before it allows the attachment to become operative in the same manner as occurs when the paid-up relay becomes operative.

I claim:

1. A subscription television system comprising a television transmitter having means for generating a composite video signal having grey-level signals in place of horizontal blanking and synchronizing signals, means for generating since wave signals having a horizontal synchronizing signal frequency, means for transmitting said generated composite video frequency modulated on a radio-frequency carrier on a first channel and said generated sine wave signals on a second channel, a receiver having means for receiving signals over said first and second channels, and means to which the outputs of said first and second channels are applied to generate horizontal synchronizing signals from said grey-level signals responsive to said sine wave signals while said grey-level signals are still modulated on said radio-frequency carrier.

2. A subscription television system comprising a television transmitter having means for generating a composite video signal including synchronizing signals, means for reducing the energy content of said synchronizing signals below that necessary for synchronization thereby, means for transmitting said composite video signals including said reduced energy synchronizing signals, means at said transmitter for deriving a sine wave signal from said synchronizing signal, means for transmitting said sine wave signal over a second channel; and a television receiver having means for receiving signals from said first and second channels, and means actuated when it is desired to view said video signals and synchronized by said sine wave signals for increasing the energy content of said synchronizing signals to the amount required to afford synchronization therewith.

3. A subscription television system comprising a television transmitter having means for generating a composite video signal including both horizontal blanking signals and horizontal synchronizing signals in the black video signal region, means for removing said horizontal blanking and synchronizing signals from said composite video signal and substituting a signal having a grey video signal level instead, means for deriving sine wave signals from said horizontal blanking signals, means for transmitting said composite video signal with said grey video level signal over a first transmission channel and said sine wave signals over a second transmission channel, and a television receiver having means for receiving signals from said first and second channels, and manually actuatable means for generating from said grey video signal level signals responsive to said sine wave signals horizontal synchronizing signals in said composite video signals received over said first channel.

4. A subscription television system comprising a television transmitter having means for generating program audio signals, means for generating audio signals representative of a barker, means for generating a composite video signal including both horizontal blanking signals and horizontal synchronizing signals in the black video signal region, means for deriving sine wave signals responsive to said horizontal blanking signals, means for removing said horizontal blanking and synchronizing signals from said composite video signal and substituting a signal having a grey video signal level instead, means for transmitting said composite video signal with said grey video signal and said audio signals representative of a barker over a first channel, means for transmitting said sine wave signals and said program audio signals over a second channel, and a television receiver having means for receiving signals from said first and second channels, manually actuatable means for inserting responsive to said sine wave signals horizontal synchronizing signals in said composite video signals received over said first channel, an audio signal reproducer in said receiver, and switch means for applying audio signals received from over said first channel when not actuated and received from over said second channel when actuated in response to actuation of said manually actuatable means.

5. A subscription television system comprising a television transmitter having means for generating program audio signals, means for generating audio signals representative of a barker, means for generating a composite video signal including both horizontal blanking signals and horizontal synchronizing signals in the black video signal region, means for deriving sine wave signals responsive to said horizontal blanking signals, means for removing said horizontal blanking and synchronizing signals from said composite video signal and substituting a signal having a grey video signal level instead, a source of potential, means for transmitting said composite video signal with said grey video signal and said barker representative audio signals over a first channel, a wire line to which said sine wave signals, said program audio signals, and potential from said source of potential are applied, a receiver connected to said wire line, said receiver having means for receiving signals from said first channel, a relay, manually operable switch means for applying potential from said line to said relay to render it operative, means for recording the operation of said relay, means responsive to said relay being operated for inserting responsive to said sine wave signals received over said wire line horizontal synchronizing signals in said composite video signals received over said first channel, an audio signal reproducer in said receiver to which audio signals received from said first channel are applied, and means responsive to operation of said relay for applying audio signals received from said wire line to said audio signal reproducer in place of said audio signals received from over said first channel.

6. A subscription television system comprising a transmitter having means for generating a composite video signal having the synchronizing signal energy content reduced below the value necessary for affording synchronization thereon, means for transmitting said composite video signal to receivers over a first channel, means at said transmitter for generating a sine wave signal having the same frequency and phase as said horizontal synchronizing signals, a source of potential at said transmitter, means for transmitting said sine wave signals and potential from said source to receivers over a second channel, and a receiver coupled to said first and second channels and having an amplifier for said composite video signals, means to apply exciting potential from said second channel to said amplifier, manually actuatable means for increasing the gain of said amplifier responsive to said sine wave signals to increase to the energy content value necessary for affording synchronization the synchronizing signal of said composite video signal.

7. In a television transmitter wherein there is generated a composite video signal including horizontal blanking and horizontal synchronizing signals, means for modifying said composite video signal for use in subscription television comprising means for substituting for said horizontal blanking and horizontal synchronizing pulses grey-level pulses having an amplitude less than that of said horizontal blanking pulses, means for deriving sine waves from said horizontal blanking pulses, and means for transmitting said modified composited video signal and said sine waves on two separate channels.

8. In a television transmitter as recited in claim 7 wherein said means for modifying said composite video signal includes a first and a second rectifier bridge network, means for applying compsoite video signals to said first bridge network, means for applying a voltage at the level desired for said grey-level pulses to said second rectifier bridge network, a common output terminal to which both rectifier bridge networks are connected, means for deriving wide horizontal blanking pulses which overlap said composite video blanking pulses, and means for blocking output from said first rectifier bridge network during the occurrence of a wide horizontal blanking pulse and for blocking output from said second rectifier bridge network when a wide horizontal blanking pulse is not present.

9. In a television transmitter as recited in claim 7 wherein said means for modifying said composite video signal includes a delay line, an amplifier to which said delay line is connected, means to apply said composite video signal to said delay line, a one-shot multivibrator having a stable and an unstable condition, the duration of said stable condition being an interval sufficient to overlap the interval of a horizontal blanking pulse, means to derive driving pulses from the horizontal blanking pulses in said delay line, means for applying said driving pulses to said one-shot multivibrator to drive from its stable to its unstable condition, and means to apply output from said one-shot multivibrator while in its unstable state to said amplifier to reduce its gain and provide a grey-level output pulse for the duration of said one-shot multivibrator output.

10. In a subscription television system of the type wherein there is transmitted over one channel composite video signals modulated on a radio-frequency carrier having grey-level pulses replacing horizontal blanking and horizontal synchronizing pulses and over a second channel sine wave signals at the frequency of and in phase with the replaced horizontal blanking signals, a television receiver having means for receiving signals from said first and second channels, means actuated when desired to view said video program for forming pulse signals from said sine wave signals received over said second channel, and means to which said pulse signals and said first channel received signals are applied for increasing the amplitude of portions of said grey-level pulses to substantially restore the horizontal synchronizing pulses into said composite video signals received over said first channel while said grey-level pulses are still modulated on said radio-frequency carrier.

11. In a subscription television system of the type wherein there is transmitted over one channel composite video signals having grey-level pulses replacing horizontal blanking and horizontal synchronizing pulses, and sine wave signals over a second channel at the frequency of and in phase with said replaced horizontal blanking signals, an attachment for enabling a television receiver to utilize said signals comprising means for receiving said composite video signals from said first channel, an amplifier having an output coupled to said television receiver input and an input to which composite video signals are applied, means for receiving said sine wave signals over said second channel, means for forming pulses from said sine wave signals, and means for adding said pulses to said composite video signals in the input to said amplifier.

12. In a subscription television system of the type wherein there is transmitted over one channel composite video signals having grey-level pulses replacing horizontal blanking and horizontal synchronizing pulses and over a wire link energizing potential and sine wave signals at the frequency of and in phase with said replaced horizontal blanking signals, an attachment for enabling a television receiver to utilize said signals comprising a relay having a pair of normally open contacts one of which is connected to said wire link and the other of which is connected to said relay coil, manually actuatable switch means to apply potential from said line to said relay whereby said relay is energized and latched over its own contacts, means for recording an actuation of said switch means, a pulse-forming network, means to apply sine wave signals from said relay contacts to said pulse-forming network, an amplifier means to apply operating potential to said amplifier from said relay contacts, means to receive said composite video signals over said one channel, means to add said composite video signals and the output of said pulse-forming network, means to connect the output of said means to add to the input to said amplifier, and means to apply the output of said amplifier to said television receiver.

13. In a subscription television system of the type wherein there is transmitted over one channel composite video signals having grey-level pulses replacing horizontal blanking and horizontal synchronizing pulses, and audio signals representative of a barker, and over a wire link there is transmitted, energizing potential, audio signals associated with said video signals, and sine wave signals at the frequency of and in phase with said replace horizontal blanking signals, a receiver for said signals having a relay having a pair of normally open contacts one of which is connected to said wire link and the other of which is connected to said relay coil, manually actuatable switch means to apply potential from said wire to said relay whereby said relay is energized and latched over its own contacts, means for recording an actuation of said switch means, a pulse-forming network, means to apply sine wave signals from said relay contacts to said pulse-forming network, an amplifier, means for applying operating potential from said relay contacts to said amplifier means to receive said composite video signals and barker representative audio signals over said one channel and to apply them to said amplifier, an audio signal reproduced in said receiver, switch means for applying audio signal output from said receiver, switch means for applying audio signal output from said amplifier to said audio signal reproducer when said relay is not operated and for applying audio signal output from said wire link to said audio reproducer when said relay is operated, and means to add the output of said pulse-forming network to said composite video signals at the input to said amplifier.

14. In a subscription television system of the type having a plurality of receivers to which there are transmitted composite video signals modulated on a radio-frequency carrier and reconstituting signals having the frequency and phase of the horizontal synchronizing signals, said composite video signals having grey-level signals in place of horizontal blanking and synchronizing signals, means at each receiver for receiving said composite video signals and said reconstituting signals, and means to which said received signals are applied for recreating horizontal synchronizing signals from said grey-level signals in said composite video signals responsive to said reconstituting signals while said composite video signals are still modulated on said radio-frequency carrier.

15. In a subscription television system of the type having a plurality of receivers to which there are transmitted composite video signals modulated on a radio-frequency carrier and reconstituting signals having the frequency and phase of the horizontal synchronizing signals, said composite video signals having grey-level signals in place of horizontal blanking and synchronizing signals, means at each receiver for reconstituting said transmitted composite video signals comprising means for receiving said transmitted signals, and means to which the outputs of said means for receiving are applied for increasing the level of a portion of each of said grey-level signals to a value sufficient to afford horizontal synchronization with said composite video signals while said composite video signals are still modulated on said radio-frequency carrier.

16. In a subscription television system of the type having a plurality of receivers to which there are transmitted composite video signals modulated on a radio-frequency carrier and reconstituting signals having the frequency and phase of the horizontal synchronizing signals, said composite video signals having grey-level signals in place of horizontal blanking and synchronizing signals, an attachment for connection to the antenna terminals of a receiver comprising means for receiving said reconstituted signals, means for receiving said composite video signals modulated on a radio-frequency carrier, and means connected to receive the signals of both said means for receiving for increasing the level of a portion of each of the grey-level signals to a value required for enabling horizontal synchronization of a receiver to said composite video signals when demodulated.

17. In a subscription television system of the type having a plurality of receivers to which there are transmitted composite video signals modulated on a radio-frequency carrier and sine wave signals having the frequency and phase of the horizontal synchronizing signals, said composite video signals having grey-level signals in place of horizontal blanking and synchronizing signals, an attachment for connection to the antenna terminals of a subscriber receiver comprising means for receiving said transmitted composite video signals modulated on a radio-frequency carrier and said sine wave signals, a multiplying means, and means for applying said received signals to said multiplying means to enable said multiplying means responsive to said received sine wave signals to increase the level of a portion of each of said grey-level sgnals to a value required to afford horizontal synchronization while said composite video signals are still modulated on said radio-frequency carrier.

18. In a subscription television system of the type having a plurality of receivers to which there are transmitted composite video signals modulated on a radio-frequency carrier and sine wave signals having the frequency and phase of the horizontal synchronizing signals, said composite video signals having grey-level signals in place of horizontal blanking and synchronizing signals, an attachment for connection to the antenna terminals of a subscriber receiver comprising means for receiving said transmitted composite video signals modulated on a radio-frequency carrier and said sine wave signals, means connected to said means for receiving for adjusting the phase of said sine wave signals for any deviations from the phase when transmitted, means for forming pulses from said phase-adjusted sine wave signals, a multiplying means, means to apply said pulses and said received composite video signals to said multiplying means to render it operative during said pulse interval to increase the level of a portion of each of said grey-level signals to a value required to afford horizontal synchronization while said composite signals are still modulated on said radio-frequency carrier.

References Cited in the file of this patent

UNITED STATES PATENTS

| | | |
|---|---|---|
| 2,510,046 | Ellett | May 30, 1950 |
| 2,567,539 | Aram | Sept. 11, 1951 |
| 2,705,740 | Druz | Apr. 5, 1955 |